United States Patent Office 2,755,699
Patented July 24, 1956

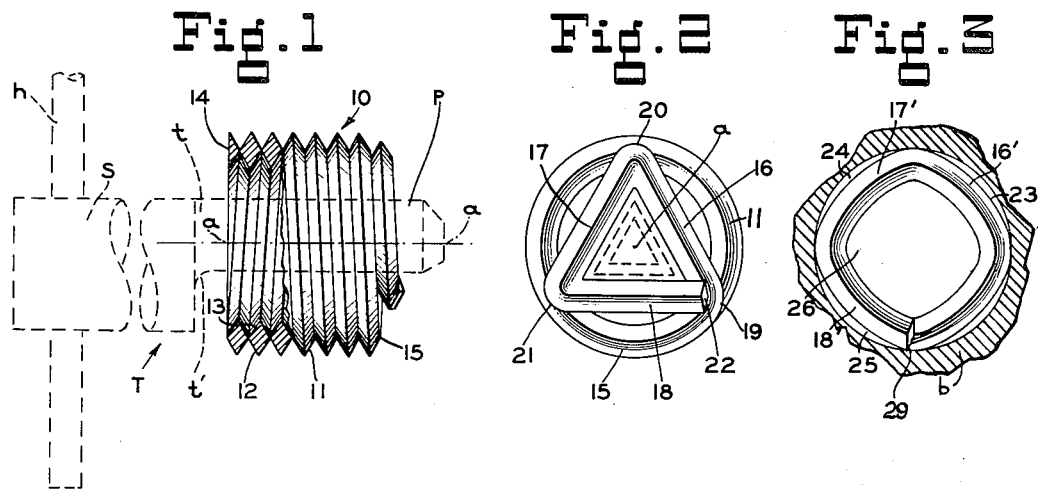

2,755,699

WIRE COIL SCREW THREAD INSERT WITH GRIP END HAVING AN ANGULAR CONFIGURATION

John O. Forster, Harrison, N. Y., assignor to Heli-Coil Corporation, Danbury, Conn., a corporation of Delaware Application June 8, 1954, Serial No. 435,294

6 Claims. (Cl. 85—45)

The invention relates to a wire coil insert for the tapped hole of a nut or boss member. The insert is of the type described in my copending abandoned application for U. S. patent Serial No. 368,400, filed July 16, 1953, of which the present application is a continuation in part.

The invention aims to provide a wire coil thread insert with means for facilitating the insertion of the insert, and it also aims so to form the mentioned means that the coil after the insertion acquires certain locking properties preventing the threaded male member from loosening during its operational life-time because of vibrational forces.

The conventional wire coil screw thread inserts are provided, at one of their ends, with a diametrical tang in a plane at right angles to the axis of the insert. The tang can be gripped by a slotted tool projected through the coil from the other side thereof, and by turning the tool about the coil axis the coil can be screwed into a boss or nut member while the coil is simultaneously contracted whereby the friction during the insertion is reduced. Such conventional tang-provided coil has severe drawbacks. On the one hand, when the coil diameter is small, it is very difficult to make a tool strong enough properly to grip the tang. On the other hand, in most instances, the tang must be broken off and removed after the insertion of the coil because the tang would prevent a bolt from being screwed through the coil.

Therefore, it is another object of the invention to provide a coil insert which avoids the mentioned drawbacks, and so to form the coil end that it can be gripped by a tool with a solid rather than a slotted working end portion, and that the coil end after the insertion, rather than being broken off can be reshaped for threaded engagement with a bolt or stud screwed into the coil.

For this purpose and according to the invention a wire coil screw thread insert is provided with at least two adjoining substantially straight portions in continuation of an end convolution of the coil. These portions enclose an angle with each other so that the coil axis passes through between said portions, the ends of which are located on a helix of a pitch equal to that of said coil. The named portions which form an angular configuration can be so reformed after the insertion of the coil that they can be threadedly engaged by a bolt or stud.

Further objects and details of the invention will be apparent from the description given hereinafter and the accompanying drawing illustrating embodiments thereof by way of example.

In the drawing:

Fig. 1 is a side-elevation partly in section of an insert, according to the invention, Fig. 2 is a front elevation thereof, Fig. 3 is a front elevation of the insert of Fig. 1, with the grip end reformed after the coil has been inserted in a nut or boss, Figs. 4 and 5 are front elevations similar to Fig. 2 of two different modifications, Fig. 6 is a front elevation of another modification, Fig. 7 is a section according to line 7—7 of Fig. 6, and Figs. 8, 9 and 10 illlustrates three further modifications.

Referring now to the drawings, Figs. 1 and 2 show a screw thread insert 10 wound of a diamond-shaped wire so as to form a cylindrical coil body 11 the outer portions 12 of which constitute a male thread whereby the coil can be screwed into a tapped hole of corresponding shape and pitch and adequate diameter. The inner portions 13 of the coil form a female thread for a bolt or stud. Although only diamond-shaped cross-sections are shown in the drawing, other wire cross-sections may be used in order to furnish any other desired thread forms. Insert coils of the type under consideration are wound with a diameter larger than that of the hole for which they are destined. They must be contracted before or during the insertion so that they seat firmly in the thread of the boss or nut owing to the spring effect of the helically wound wire when released after the insertion. Such contraction is necessary as otherwise high friction would render it impossible to screw the coil in.

In order to be able to apply a torque to the end of the coil which leads during the insertion, the leading coil end is so formed that it constitutes a grip for a suitable tool. According to the invention the form is such that a tool with a solid working end can be used for inserting the coil by applying a torque to the grip and that the shape of the grip can be readily so reshaped after the insertion that a bolt screwed into the coil from the trailing end can pass through the reshaped leading end.

For this purpose, a piece of wire in continuation of the end convolution of the coil which is the leading end during the insertion is so bent that it forms at least two adjoining substantially straight or slightly curved portions enclosing an angle therebetween and being so located that these portions are in the position approximately of chords in relation to a helix of the same pitch as that of the helix of the body convolutions and that the ends of these portions are located on such helix. In a front elevation of the coil the substantially straight wire portions form an angular configuration either wholly by themselves or together with an arc of the end convolution of the coil between the ultimate free end and the point where that end convolution adjoins one of the mentioned portions. The angular configuration is so located that it encompasses the axis of the coil. In the embodiments of Figs. 1 and 2, the trailing coil end is denoted by 14 and the leading end convolution by 15. The wire adjoining this convolution is so bent that it forms, in the front elevation of Fig. 2, a triangular configuration having the sides 16, 17 and 18. The corner 19 between the end convolution 15 and the adjoining side 16 may be located on the outer circumference of the coil body 11 in the free, i. e. the non-contracted state. The corner 20 between the sides 16 and 17, and the corner 21 between the sides 17 and 18 are located on smaller diameters. These smaller diameters are preferably of a size between the minor diameter $d_1$ and the major diameter $d_2$ (indicated in Fig. 7) of the tapped thread of a boss or nut for which the insert is destined. In most instances, the free end 22 of the ultimate side portion 18 should be similarly located so that upon the insertion of the contracted coil the end 22 engages in the groove of the mentioned tapped thread preferably, however, without bearing on the bottom of that groove in order to avoid the possibility of causing burrs or of otherwise injuring the tapped thread during the insertion. It is further to be noted that the corners 19, 20 and 21 and the ultimate end 22 are located on one convolution of a helix of a pitch substantially equal to the pitch of the helix of the coil body 11. Thus, the sides 16, 17 and 18 of the triangular grip end are approximately in the position of chords in relation to the helix on which the mentioned corners are located, and encompass the axis $a$—$a$ of the coil body 11.

The coil according to Figs. 1 and 2 can be inserted in a nut or boss member, e. g. by means of a rod-like tool T with a front portion t of a triangular cross-section which fits the inner triangular space within the grip end of the coil. A short tapered free end portion p of the tool serves as a pilot end. A rounded out smooth section t' is blended in between the triangular portion t and a cylindrical portion s. The diameter of the portion s is substantially equal to the inner diameter of the coil body when the latter is contracted for insertion. In all cross-sections of the triangular portions the centers of the triangles are located on the axis of the tool portion s which is provided, at its free end, with a handle h or other means for the application of a torque either by hand or by power.

When the coil is to be inserted in a tapped hole of a boss or nut b, the tool is first inserted into the coil from its end 14, so that the portion t engages the grip end of the coil which, then, may be screwed by means of the tool into the tapped hole. In so doing, first the coil end 22 and then the corners 21, 20 and 19 in this sequence, will enter the tapped thread whereupon the convolutions of the coil body will follow, as the torque applied by the tool to the grip end of the coil will cause a contraction of the latter during the insertion. When the torque is relieved, the coil convolution will expand to be firmly seated in the tapped thread. If, then, the tool while still engaging the grip end formed by the side portions 16, 17 and 18 is turned in the opposite direction, it will tend further to expand the coil. Thereby the coil will be so firmly pressed into the tapped thread that the coil cannot be turned. Provided the torque applied to the tool is high enough, the tool will turn within the triangular grip end to urge the sides 16, 17 and 18 outward. Thereby the shape of the sides of the original triangle will be changed more and more until, finally, a form approximately as shown in Fig. 3 is obtained. In this figure, the coil body 11 is shown contracted and the reshaped grip end portions are denoted by 16', 17' and 18'. However, even though the new shape thus caused by the tool will be permanent, the ultimate shape of the grip end will not be exactly circular but a certain flattening of the portions originally forming the triangle will remain and there will be gaps 23, 24 and 25 between the reformed sides, and the outer periphery of the coil. Nevertheless, the opening 26 between the portions 16', 17' and 18' will be large enough for a bolt or stud screwed into the coil from the end 14, to enter that opening and further to spread the reformed portions so that the latter engage the bolt or stud thread. When screwing a bolt into the reshaped grip end there might be the danger of the bolt taking the insert along if the friction between the bolt and the grip end is very high. Such happening can be prevented by extending the free end 22 so far towards the periphery of the coil that after the reshaping of the inserted coil the outermost end corner 29 is located on that periphery. In that event the corner 29 will dig into the material of the boss into which the coil is inserted and prevent the turning of the latter by the bolt. Clearly, however, the friction between the portions 16', 17' and 18' and the engaged thread will be considerably higher than that of the inner convolutions of the thread body. Hence, the reformed coil end owing to its resiliency has a certain locking effect on the bolt or stud. Simultaneously, if a reversing torque occurs, there will be a tendency to spread the coil thereby anchoring the latter still more firmly in the tapped hole. It is, of course, not necessary to use the same tool which is used for inserting the coil, also for reshaping the original grip form. Any other useful tool or device may be employed for the inserting and reforming operations.

It has been stated that gaps such as 23, 24 and 25 will remain between the reformed sides of the grip end and the outer peripery of the inserted coil. These gaps are not merely an incidental occurrence. They are in fact essential features of the grip end by permitting the elastic deformation of the side portions 16', 17' and 18' while engaging a male threaded member. Unless the mentioned gaps are present, the reformed grip end might be too tight for a large screw, or if it is made big enough for a large screw it would be too loose for a smaller screw. Hence, these gaps permit a desirable flexibility of the grip end insert.

It will be noticed that the side 16 of the triangle is slightly longer than the side 17, and that the corner 19 is located on the diameter of the free coil body 11. This is not necessarily so. On the contrary, in certain instances it may be desirable to locate the corner between the coil end portion and the adjoining side of the grip configuration on a smaller diameter. This is shown in Fig. 4 where the end of the coil convolution 27 is of a gradually reduced diameter, and the corner 19' is set inward with respect to the outer diameter of the coil body 11. Simultaneously the side 16" is reduced to the size of the side 17".

It has been stated with respect to Fig. 2 that in most instances the end 22 of the grip end should be located on the end of a diameter of a length similar to those on which corners 20 and 21 are located. Under certain conditions, however, it is desirable that the last leg or side of the grip end is made shorter as e. g. shown with respect to the side 18" in Fig. 4. In fact, the side 18" is substantially in the position of but shorter than a chord of the helix on which the corners are located. The shortened last side may be provided in order to simplify the installation and a subsequent operation whereby the insert is more firmly seated in the tapped hole to which it is applied. This specifically holds true on fine thread inserts when the long last side might act like a hook trying to grip a seating tool and permit the insert to move along with the seating tool. However, care must be taken even under the mentioned circumstances not to make the last side too short. It must be long enough so as to permit a seating tool permanently to reshape the last side to have it properly seated in the tapped thread after the seating operation. It will be clear that there is the danger if the last side is too short that it will not come in contact with the seating tool or not be subject to enough pressure by the seating tool to cause the required permanent reformation. The proper length can be readily found by trial. It should be at least as long as half the length of the chord on which it is located as shown in Fig. 4. The foregoing statements regarding a short last leg of the angular configuration apply as well to grip ends of other than the triangular shape of Fig. 4, another example being shown at 51 in Fig. 8.

It is not necessary that the triangle of the grip end is equiangular as shown in Figs. 2 and 4. Furthermore, one or more than one of the sides of the triangle, and the same is true with respect to other angular configurations, may be arcuate. Hence, the term "substantially straight wire portion" used herein is to be understood as comprising any wire portion extending and constituting a connection between two corners regardless whether or not such connection coincides with a straight line between these corners. Thus, an isosceles grip end of a coil body 30 is shown in Fig. 5, wherein the two sides 31 and 32 are straight and the third arcuate side 33 is formed by the end portion of the leading coil convolution. As to the corners of the grip end the same is valid as stated with respect to the form of Figs. 1 to 3. Of course, the inserting tool for this coil will have triangular portions fitting the particular shape of the grip end of Fig. 5.

The grip end of Fig. 5 is recommended for coils of very small diameter and wire thickness. For somewhat larger diameters and wire thickness the grip ends according to the preceding figures is preferable. Generally it can be stated that the larger the coil diameter and the thickness of the coil wire the more sides should form the angular configuration of the grip end of the coil in order to facilitate, after the insertion of the coil the changing of the original form of the grip end into an approximately circular one. Thus, Fig. 6 shows a square grip end 40. In this figure, it is assumed that the coil body 41 is just so much contracted that it seats properly in the tapped thread groove g of the boss member b into which the coil is inserted in Fig. 7. It will be noticed that the diameter on which the corners 42, 43 and 44 and the ultimate end 45 are located is between the minor diameter $d_1$ and the major diameter $d_2$ of the tapped thread.

Equilateral or approximately equilateral forms are preferred but unequal forms may also be used as for instance the rectangular form of the grip end 50 in Fig. 8. It has been stated that, the greater the coil diameter and the thickness of the coil wire, the more sides the angular configuration of the grip end should have. However certain general conditions have to be fulfilled otherwise difficulties will arise with the tools which, as stated hereinbefore, have to have cross-sections fitting the grip ends of the coils. I have found that such a tool turned in a direction to insert the coil will slip in the grip end or start to deform the grip rather than contract the coil as necessary for the insertion unless the grip configuration comprises at least two corners each of which forms an angle of not more than 90 degrees, the two corners being circumferentially spaced from each other more than 90°. Now it will be clear that a diametrical tang of the conventional form is not useful for the purpose of the present invention because even in conjunction with the adjoining coil body convolution it does not form an angular configuration encompassing the axis nor does the coil end have two angles of not more than 90° each. Even if one would provide the tang sideways of the axis so that the latter would be located between the tang and an adjoining coil body portion, the mentioned condition regarding the number and size of corner angles would not be fulfilled.

The prescription regarding the size of the angles seems to exclude the use of grip ends having more than four sides. However, such grip ends can be useful if the sides forming at least two of the corners are bent somewhat inward. This is shown in Fig. 9 where the grip end comprises the sides 60, 61, 62, 63 and 64. It will be noticed that the sides 60, 61, 62 and 63 are slightly concave whereas the side 64 forming the ultimate end is straight. In the illustrated form the opposite inner angles 65 and 66 are smaller than 90° whereas the angles 67 and 68 are somewhat larger.

Finally, it will be clear that the grip end which must encompass the coil axis in order to permit a mandrel of any suitable shape to enter the grip end coil at all times, need not appear in the front elevation of the insert as a closed configuration regardless of the number of its sides. It will be sufficient if the grip end extends around the coil axis somewhat more than 180°. Thus in Fig. 10 the grip end is formed of three sides 70, 71 and 72 similar to sides 60, 61 and 62, respectively, in Fig. 9, and further of a stub side 73. The three inner corners 74, 75 and 76 are each smaller than 90°, and the sides 70, 71, 72 and 73 encompass the coil axis c through an angle of more than 180°. As to the location of the outer corners 77, 78 and 79 and the free end 80 the same is valid as has been explained with respect to the corners 19, 20 and 21 in Fig. 2.

Thus, a wire coil thread insert has been provided which has a grip end of angular configuration encompassing the axis of the coil and into which a tool can be inserted for the application of a torque. The outer corners of the configuration and the ultimate end of the grip are located on one convolution of a helix in continuation of the helix of the insert coil so that upon a reshaping of the grip end into an approximately circular form the sides and corners of the angular configuration will be adapted to engage the groove of a tapped thread into which the coil is to be seated.

Many alterations and modifications of the structure illustrated and described hereinbefore can be made without departure from the essence and spirit of the invention, which for that reason, shall not be limited but by the scope of the appended claims.

I claim:

1. A wire coil screw thread insert comprising a cylindrical body of a wire helically wound about the cylinder axis and so shaped as to form an inner and an outer screw thread, one end convolution of said wire being bent to form a grip end of angular configuration having a plurality of sides and corners, said grip end encompassing said axis through an angle of between 180 and 360 degrees, at least two angles of said grip end, the points of which are circumferentially spaced from each other more than 90 degrees, being not larger than 90 degrees, each of the ends of the sides of said grip end being located on a helix in continuation of the helix of said body, each corner formed by two adjacent ones of said sides being located on diameters slightly larger than the minor diameter but not larger than the major diameter of the tapped hole for which said insert is destined.

2. A wire coil screw thread insert as claimed in claim 1 wherein a first one of the sides of said angular configuration forms a first corner with the helically wound wire of said body and a second corner with a second side of said configuration, the outer edge of said first corner being located on the one end of a diameter substantially equal to the diameter of the outer periphery of said cylindrical body, and the outer edge of said second corner being located on the one end of a diameter slightly smaller than the major diameter of a tapped thread for which said insert is destined.

3. A wire coil screw thread insert as claimed in claim 1, in which the ultimate end of said grip end has an outer corner, said outer corner being located on the end of a diameter smaller than the major diameter but larger than the minor diameter of a tapped thread for which said insert is destined.

4. A wire coil screw thread insert as claimed in claim 1 in which at least one of the sides of the configuration is arcuate.

5. A wire coil screw thread insert as claimed in claim 1, wherein said grip end has a free ultimate end, the side forming said ultimate end being substantially in the position of a chord of said helix and being of a length more than half the length of said chord so as to be adapted to be permanently so reformed by pressure from the inside of said grip end that the ultimate end will be located at the end of a diameter at least as large as the minor diameter of the tapped hole for which said insert is destined.

6. A wire coil screw thread insert lining the thread of the tapped hole of a boss or nut member, said insert comprising a cylindrical body of a helically wound wire seated in the groove of said tapped thread, the convolutions of said helically wound wire being uniformly curved except for that end convolution which was leading during the insertion of said coil into said tapped thread, said end convolution being bent to form an angular configuration having a plurality of sides and corners, the corners of said end convolution and its ultimate free end being also seated in said thread groove in one convolution thereof, the sides of said configuration being curved concave as seen from the axis of said body, the radii of said curvatures of said sides being larger than the major radius of said tapped thread so that there are substantially crescent-shaped gaps between said sides and the bottom of said thread groove, said ultimate free end having an outer sharp corner adapted to dig into the material of said boss or nut member when a force tends to screw said insert deeper into said tapped hole.

(References on following page)

References Cited in the file of this patent

UNITED STATES PATENTS

| | | |
|---|---|---|
| 1,150,483 | Barber | Aug. 17, 1915 |
| 2,363,662 | Findley | Nov. 28, 1944 |
| 2,363,663 | Findley | Nov. 28, 1944 |

FOREIGN PATENTS

| | | |
|---|---|---|
| 393,675 | Great Britain | June 15, 1933 |
| 624,979 | Great Britain | June 20, 1949 |
| 637,340 | Great Britain | May 17, 1950 |